United States Patent [19]

Spencer

[11] Patent Number: 5,154,585
[45] Date of Patent: Oct. 13, 1992

[54] SYSTEM FOR LUBRICATION OF A BRAKE AIR COMPRESSOR ASSOCIATED WITH A TURBOCHARGED INTERNAL COMBUSTION ENGINE

[75] Inventor: Joseph C. Spencer, Kansas City, Mo.

[73] Assignee: Midland Brake, Inc., Kansas City, Mo.

[21] Appl. No.: 805,070

[22] Filed: Dec. 11, 1991

[51] Int. Cl.$^5$ ............................................. F04B 17/00
[52] U.S. Cl. .................................................. 417/364
[58] Field of Search ........................................ 417/364

[56] References Cited

U.S. PATENT DOCUMENTS 4,652,216  3/1987  Eslinger et al. .................... 417/364
4,755,110  7/1988  Baur et al. ......................... 417/364

*Primary Examiner*—Richard A. Bertsch
*Assistant Examiner*—Charles G. Freay
*Attorney, Agent, or Firm*—Leydig, Voit & Mayer

[57] ABSTRACT

In a heavy-duty truck having a turbocharged internal combustion engine and a lubricating system wherein lubricating oil from the engine oil reservoir is circulated both within the engine and also to and from an associated brake system air compressor, supercharged air is passed to the oil crankcase of the air compressor to cause lubricating oil to drain therefrom and return to the engine oil reservoir. This minimizes windage and resulting engine power losses, reduces oil consumption and avoids problems associated with the undesired entry of lubricating oil into the brake system via the air compressor.

8 Claims, 1 Drawing Sheet

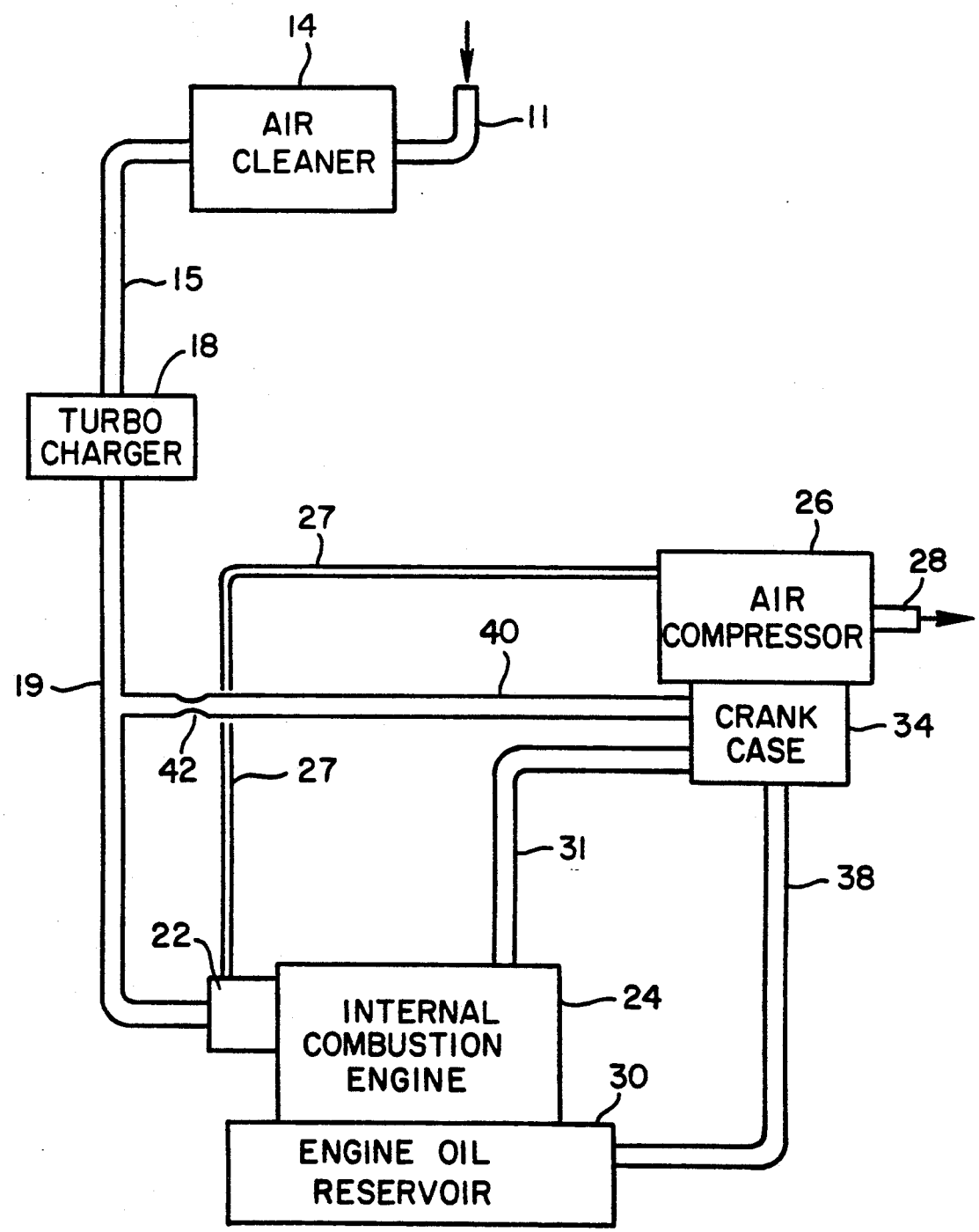

SYSTEM FOR LUBRICATION OF A BRAKE AIR COMPRESSOR ASSOCIATED WITH A TURBOCHARGED INTERNAL COMBUSTION ENGINE

The present invention relates to improvements in a system for use with vehicles which includes a compressed air braking system and a turbocharged internal combustion engine. More particularly, the invention relates to lubricating improvements in a vehicular system which includes an air compressor for supplying compressed air to a pneumatic braking system and a turbocharged internal combustion engine having a lubricating system which supplies lubricating oil to both the engine and air compressor.

BACKGROUND OF THE INVENTION

As is well known, heavy duty road vehicles, such as trailer tractors, employ compressed air brake systems. Such heavy duty vehicles are commonly equipped with a turbocharged or supercharged internal combustion engine and the pneumatic brake system obtains its supply of air from the air intake manifold of the vehicle engine where the air is already at superatmospheric pressure, say 25 psig, as a result of supercharging. Such pneumatic or air braking systems generally involve an air compressor operable in normal or unloading modes, a governor for controlling the operating cycle of the air compressor, an air dryer and a reservoir for holding pressurized air for delivery to the vehicle brakes.

When the pressure in the air reservoir falls below a predetermined minimum pressure, say about 100 psig, the compressor governor then causes the air compressor to operate in a normal or loading mode to compress air. The compressed air from the air compressor during its normal or compressing cycle is passed through an air dryer to remove moisture and then into the air brake reservoir or reservoirs. When the desired pressure, say about 120 psig, is attained in the pressurized air reservoir, the compressor governor functions to cause the air compressor to unload (unloading mode).

The air compressor utilized in the braking system requires lubrication, particularly when in the compressing mode. Rather than use an independent lubrication system for the ancillary air compressor, the internal combustion engine with its substantial lubrication system has been used not only to drive the compressor but also to provide lubrication therefor. In such systems, the air compressor is typically mounted on the engine and pressurized lubricating oil is pumped to the air compressor for lubrication while it is compressing and then drains by gravity through a suitable conduit back to the engine oil reservoir.

While the lubricant requirements of the air compressor are small relative to the lubricant requirements of the engine, it is important that the compressor receive adequate lubrication without undue increase in oil consumption. A serious problem which workers in the art have encountered is the build-up of the lubricating oil level in the crankcase of the air compressor.

The undesired build-up of the lubricating oil level in the crank case of the compressor is caused in some applications by the fact that the compressor has to operate at angles and orientations which do not allow the oil to drain back to the engine oil reservoir freely. Also, in some applications, back pressure in the engine oil reservoir does not allow the oil to freely drain back from the compressor.

When the level of lubricating oil in the crankcase of the air compressor becomes high by failure to drain back to the engine oil reservoir, the connecting rods of the compressor impact and dip into the crankcase oil. This in turn increases engine power requirements to drive the air compressor, reduces power available for propelling the vehicle, and is commonly referred to as windage loss.

Oil consumption is also increased because the oil is splashed up around the compressor cylinders and moving pistons, increasing the amount of oil bypassing the rings. Excess oil bypass can be particularly deleterious, quite aside from the oil loss. For example, the bypassed oil may enter the air brake system, gumming up the valves, deteriorating the desiccant in the air dryer, etc., as those skilled in the art will recognize.

Applicant herein recognized that these problems are somewhat analogous to problems encountered with systems employing transmission oil to lubricate axles and the potential for oil build-up in the axle spaces. Applicant further recognized that the long-standing problem of oil build-up in compressors could be solved by analogous techniques employed in the transmission-axle environment, as herein set forth.

OBJECTS OF THE INVENTION

It is a principal object of this invention to provide improved lubrication of a brake system air compressor operatively associated with a turbocharged internal combustion engine.

It is another object of this invention to provide an improved system for lubrication of a brake system air compressor which is driven by a turbocharged internal combustion engine which provides lubrication of the air compressor.

It is a further object of this invention to provide an improved system for lubrication of a brake system air compressor to which lubricating oil is supplied under pressure from the main lubricating system of a turbocharged internal combustion engine.

It is a still further object to reduce oil consumption and loss of engine power in a system wherein lubricating oil under pressure from the main lubricating system of a turbocharged internal combustion engine is used to lubricate an associated ancillary brake system air compressor.

It is a more specific object to eliminate or minimize windage losses, reduce oil consumption in such systems, and avoid the problems associated with the undesired entry of lubricating oil into brake systems via the air compressor.

These and other object will become apparent as the detailed description proceeds.

SUMMARY OF THE INVENTION

The present invention relates to a system for use with a vehicle which employs a turbocharged internal combustion engine and an air braking system. The lubricating system of the engine supplies lubricating oil to both the engine and the air compressor of the braking system and turbocharged air is employed to assure drainage of the oil from the crankcase of the air compressor back to the oil reservoir of the engine.

The present invention involves a system for use with a vehicle which includes a compressed air braking system in which an air compressor having an oil crankcase is employed. an internal combustion engine having a lubricating system which supplies lubricating oil from a reservoir to the engine and the air compressor. a turbocharger for supplying air at superatmospheric pressure to the engine and means for supplying air at superatmospheric pressure to the oil crankcase of the air compressor.

DESCRIPTION OF THE DRAWING

The present invention will be more clearly understood from the following detailed description of a preferred embodiment, read in conjunction with the accompanying drawing, which is a functional schematic diagram of a system in accordance with the present invention.

DESCRIPTION OF PREFERRED EMBODIMENT

Referring to the drawing, air is drawn in through air inlet 11 and passes through a conventional air cleaner 14. The inlet air then passes via conduit 15 to turbocharger 18 which pressurizes or supercharges the air to above atmospheric pressure, say 25 psig. The supercharged inlet air then passes via conduit 19 to the air intake manifold 22 of the internal combustion engine 24. Supercharged air for further compression in air compressor 26 for operation of the air-brake system is supplied thereto from intake manifold 22 through line 27. Compressed air exits air compressor 26 via outlet, 28 for operation of the air brake system of the vehicle (not shown), which may be of conventional design.

A supply of lubricating oil is maintained in engine oil reservoir 30, from which the lubricating oil is pumped in a known manner to effect lubrication of the engine 24. The oil pump (not shown) also routes a portion of the lubricating oil through line 31 to the crankcase 34 of air compressor 26. The oil from crankcase 34 lubricates and reduces friction between the moving parts of the compressor. Desirably, the lubricating oil drains from crankcase 34 by gravity through drain line 38 back to the engine oil reservoir 30.

However, as already set forth, in some vehicular applications the disposition or orientation of the air compressor is such that lubricating oil does not freely drain back to the engine oil reservoir 30. Also, in some applications the back pressure in engine oil reservoir 30 is such as to prevent oil freely draining from crankcase 34 to oil reservoir 30. In such cases, the lubricating oil builds up in crankcase 34 so as to impede the operation of the air compressor because of increased friction and heat due to the compressor rod dipping into the high oil level, i.e., windage loss, which in turn increases engine power required to drive the air compressor. Oil consumption is also increased because the rods are dipping into the oil and splashing the oil up around the piston rings, which increases the amount of oil bypassing the rings. The resulting excess oil in the brake system can lead to deterioration in brake performance as those skilled in the art will recognize.

To insure that the lubricating oil circulates from the air compressor crankcase 34 back to oil reservoir 30 and doesn't build-up in crank case 34, super-charged air is directed into the crankcase in accordance with the present invention. One preferred means for introducing supercharged air into the crankcase is the provision of a turbo boost air line 40 which provides communication between the outlet side of the turbocharger 18 and the crankcase 34.

The turbo boost air line 40 has a portion of reduced diameter to form a flow control orifice 42 which restricts the flow of supercharged air to the crankcase. Flow control orifice 42 is of a size (to be determined by each application) so that the flow of supercharged air through turbo boost air line 40 is kept at a minimum volume to conserve air and to avoid excess air flow out of the engine breather. Air is constantly flowing through line 40 and the orifice 42 to air compressor crankcase 34, the flow rate being kept to a minimum. When oil does not drain freely from air compressor crankcase 34 back to the engine oil reservoir 30 via drain line 38, the air pressure builds up in compressor crankcase 34 and forces the oil back.

Flow control orifice 42 only needs to be large enough so that it does not plug up from dirt which may be in the air stream. The orifice should be as small as possible, the size being determined by the maximum-size particle encountered in the supercharged air, as determined by air cleaner efficiency. In an illustrative installation, for example, air line or conduit 40 may have an inside diameter of 0.25" and flow control orifice 42 may have a minimum diameter of 0.025".

While the air flow to the air compressor crankcase 34 is thus minimized by means of orifice 42, it should be noted that the air source is the engine turbocharger and not the pressurized brake system air. Bleeding air from the brake system is to be avoided.

From the detailed description, it will be apparent to those skilled in the art that the objects of the invention have been achieved. While only a preferred embodiment has been set forth, alternative embodiments and various modifications will be apparent from the above description to those skilled in the art. Those alternative embodiments and modifications which fall within the spirit of the invention are to be considered equivalents and a part thereof. It is to be understood that allowed claims based on this application are to be accorded a range of equivalents commensurate in scope with the advance made over the prior art.

What is claimed is:

1. In a system for use with a vehicle which includes a turbocharged internal combustion engine having a lubricating system wherein lubricating oil from an engine oil reservoir is circulated within the engine and also to and from an associated brake system air compressor which supplies compressed air for operation of the vehicle air braking system, the improvement which consists in passing supercharged air to an oil crankcase of the air compressor to cause lubricating oil to drain therefrom and return to the engine oil reservoir.

2. The system of claim 1 wherein the supercharged air passed to the oil crankcase of the air compressor is bled from the turbocharged air supplied to the internal combustion engine.

3. The system of claim 1 wherein the supercharged air to the oil crankcase of the air compressor passes through a flow control orifice to minimize the flow thereof.

4. A system for use with a vehicle which includes in combination,
   (a) a compressed air braking system, including an air compressor having an oil crankcase,
   (b) an internal combustion engine having a lubricating system which supplies lubricating oil from an engine oil reservoir to the engine and the air compressor, (c) a turbocharger for supplying air at superatmospheric pressure to said internal combustion engine, and (d) means for supplying air at superatmospheric pressure to the oil crankcase of the air compressor to force the lubricating oil therein to return to the engine oil reservoir.

5. The system of claim 4 wherein said means for supplying air at superatmospheric pressure comprises an air flow line having a flow control orifice therein.

6. The system of claim 4, wherein said means for supplying air at superatmospheric pressure receives the air from said turbocharger.

7. A lubrication system for an air brake compressor of a vehicle having a turbocharged internal combustion engine comprising, (a) a compressed air braking system, including an air compressor having an oil crankcase, (b) an internal combustion engine having an engine oil reservoir for supplying lubricating oil to the engine and to the crankcase of the air compressor and for receiving lubricating oil returned therefrom, (c) a turbocharger for supplying turbocharged air to said internal combustion engine, and (d) means for supplying turbocharged air from the turbocharger to the oil crankcase of the air compressor to force the lubricating oil therein to return to the engine oil reservoir, said means including a flow conduit for delivering the turbocharged air to said oil crankcase, the flow conduit having a flow control means therein.

8. The lubrication system of claim 7, wherein said flow control means in said flow conduit comprises a restrictive orifice.

* * * * *